US008306200B2

(12) United States Patent
Bajpay et al.

(10) Patent No.: US 8,306,200 B2
(45) Date of Patent: Nov. 6, 2012

(54) METHOD AND APPARATUS FOR PROCESSING OF A TOLL FREE CALL SERVICE ALARM

(75) Inventors: Paritosh Bajpay, Edison, NJ (US); Mojgan Dardashti, Holmdel, NJ (US); Zhiqiang Qian, Holmdel, NJ (US); Michael John Zinnikas, North Brunswick, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1146 days.

(21) Appl. No.: 12/175,228

(22) Filed: Jul. 17, 2008

(65) Prior Publication Data
US 2010/0014651 A1   Jan. 21, 2010

(51) Int. Cl.
*H04M 1/56* (2006.01)
*H04Q 3/62* (2006.01)
*H04J 3/14* (2006.01)
*G06F 15/16* (2006.01)

(52) U.S. Cl. .............. 379/114.24; 340/500; 340/506; 340/522; 370/242; 370/352; 370/401; 379/9.03; 379/37; 379/93.12; 379/143; 379/211.02; 455/413; 700/295; 705/7.15; 709/203; 709/225; 714/4.3; 725/129

(58) Field of Classification Search .............. 379/93.12, 379/114.24, 201.12, 211.02, 9.03, 21, 37, 379/88.19, 112.02, 114.01, 143; 455/41.3, 455/413; 709/225, 203; 340/500, 506, 522; 370/218, 242, 352, 401; 700/295; 705/7.15; 707/10; 714/4.3; 725/129
See application file for complete search history.

(56) References Cited

U.S. PATENT DOCUMENTS

| | | | |
|---|---|---|---|
| 3,626,383 A | 12/1971 | Oswald et al. | |
| 3,653,041 A | 3/1972 | McGrath et al. | |
| 3,839,707 A | 10/1974 | Woodward et al. | |
| 4,112,488 A | 9/1978 | Smith, III | |
| 4,233,471 A | 11/1980 | Butcher et al. | |
| 4,273,955 A | 6/1981 | Armstrong | |
| 4,513,411 A | 4/1985 | Fraser | |
| 4,972,453 A | 11/1990 | Daniel et al. | |
| 5,548,720 A | 8/1996 | Fujii | |
| 5,953,389 A | 9/1999 | Pruett et al. | |
| 6,163,594 A | 12/2000 | Kennedy et al. | |
| 6,381,644 B2 * | 4/2002 | Munguia et al. | 709/225 |
| 6,467,055 B1 | 10/2002 | Katuszonek | |
| 6,687,335 B1 | 2/2004 | Jones et al. | |
| 6,690,785 B1 * | 2/2004 | Stelter et al. | 379/211.02 |
| 6,763,333 B2 * | 7/2004 | Jones et al. | 705/7.15 |
| 6,804,335 B1 * | 10/2004 | Kugell | 379/88.19 |
| 6,931,102 B2 | 8/2005 | Onweller et al. | |
| 7,130,399 B1 | 10/2006 | Jean et al. | |
| 7,139,369 B2 | 11/2006 | Martin et al. | |
| 7,257,205 B2 * | 8/2007 | Forte | 379/112.02 |
| 7,426,654 B2 * | 9/2008 | Adams et al. | 714/4.3 |
| 7,471,194 B2 * | 12/2008 | Itou | 340/500 |
| 7,525,422 B2 * | 4/2009 | Bishop et al. | 340/522 |
| 7,543,328 B2 * | 6/2009 | Bialk et al. | 725/129 |
| 7,664,233 B1 * | 2/2010 | Kirchmeier et al. | 379/37 |
| 7,688,951 B1 * | 3/2010 | Bajpay et al. | 379/9.03 |

(Continued)

*Primary Examiner* — Gerald Gauthier (57) ABSTRACT

A method and apparatus for automatic processing of toll free call service alarms are disclosed. For example, the method receives a trouble ticket by a service provider for a toll free call service alarm, and retrieves a calling to number and a calling from number from the trouble ticket. The method determines if the service provider is a responsible organization for the toll free call service for the calling to number, and determines if a customer network for the toll free call service is active if the service provider is the responsible organization for the toll free call service. The method notifies a work center if the customer network is not active.

20 Claims, 9 Drawing Sheets

U.S. PATENT DOCUMENTS

| | | | |
|---|---|---|---|
| 7,802,287 B2* | 9/2010 | Bialk et al. | 725/107 |
| 7,818,283 B1* | 10/2010 | Bajpay et al. | 707/E17.005 |
| 2002/0111139 A1* | 8/2002 | Nishiyama et al. | 455/41 |
| 2004/0060073 A1 | 3/2004 | Bialk et al. | |
| 2004/0202302 A1* | 10/2004 | Richards | 379/201.12 |
| 2004/0258227 A1* | 12/2004 | Hanna et al. | 379/114.01 |
| 2005/0240315 A1* | 10/2005 | Booth et al. | 700/295 |
| 2006/0095510 A1* | 5/2006 | Rouse et al. | 709/203 |
| 2006/0233311 A1* | 10/2006 | Adams et al. | 379/21 |
| 2006/0244585 A1* | 11/2006 | Bishop et al. | 340/506 |
| 2006/0248407 A1* | 11/2006 | Adams et al. | 714/43 |
| 2007/0013508 A1 | 1/2007 | Itou | |
| 2007/0064594 A1 | 3/2007 | Norton | |
| 2007/0217437 A1* | 9/2007 | Forte | 370/401 |
| 2007/0283012 A1* | 12/2007 | Chu et al. | 709/225 |
| 2008/0025295 A1 | 1/2008 | Elliott et al. | |
| 2008/0037742 A1* | 2/2008 | Greenberg | 379/143 |
| 2008/0226044 A1* | 9/2008 | Johnson | 379/93.12 |
| 2008/0253362 A1* | 10/2008 | Samarasinghe et al. | 370/352 |
| 2008/0298229 A1* | 12/2008 | Ballantyne et al. | 370/218 |
| 2009/0310604 A1* | 12/2009 | Alturi et al. | 370/352 |
| 2010/0014431 A1* | 1/2010 | Bajpay et al. | 370/242 |
| 2010/0014644 A1 | 1/2010 | Bajpay et al. | |
| 2010/0014651 A1* | 1/2010 | Bajpay et al. | 379/114.24 |

* cited by examiner

METHOD AND APPARATUS FOR PROCESSING OF A TOLL FREE CALL SERVICE ALARM

The present invention relates generally to communication networks and, more particularly, to a method and apparatus for providing automated processing of toll free call service alarm (e.g., also known as 8YY voice service alarms) on a switched and/or Internet Protocol (IP) network.

BACKGROUND OF THE INVENTION

A customer may subscribe to a toll free call service (e.g., 8YY voice service, e.g., 1-800 service, 1-888 service, and the like) for inbound calls, e.g. Inward Wide Area Telecommunications Service (INWATS). When a service failure or degradation occurs, it may be detected by the network service provider or reported by a customer to the network service provider. For example, if a customer detects a failure on an 8YY service, the customer may report a failure on a 10-digit telephone number. The network service provider may then dispatch maintenance personnel to perform trouble isolation and repair. However, if the calling number is an Internet Protocol (IP) telephone number, maintenance personnel has to isolate the trouble manually. In a large network, the cost of dispatching personnel for each detected and/or reported problem is extremely high. In addition, the customer may be receiving a degraded service or no service at all during the time in which trouble isolation and repair are being performed. The degraded service and the delay will affect customer satisfaction.

SUMMARY OF THE INVENTION

In one embodiment, the present invention discloses a method and apparatus for automatic processing of toll free call service alarms. For example, the method receives a trouble ticket by a service provider for a toll free call service alarm, and retrieves a calling to number and a calling from number from the trouble ticket. The method determines if the service provider is a responsible organization for the toll free call service for the calling to number, and determines if a customer network for the toll free call service is active if the service provider is the responsible organization for the toll free call service. The method notifies a work center if the customer network is not active.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention broadly discloses a method and apparatus for providing automated processing of a toll free call alarm (e.g., an 8YY voice alarm) on a switched and/or Internet Protocol (IP) network.

Figure 1:
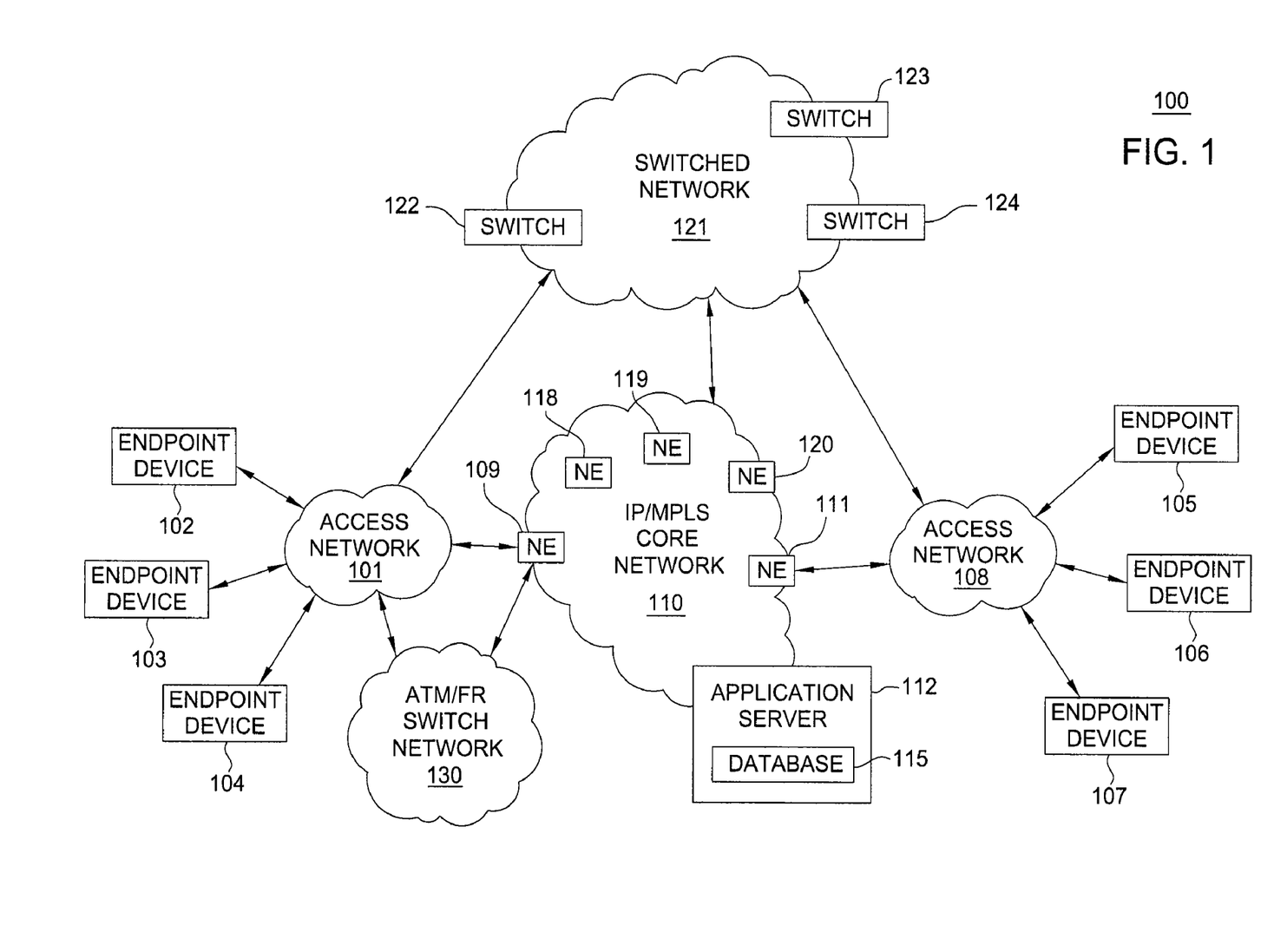
FIG. 1 illustrates an exemplary network related to the present invention.

FIG. 1 is a block diagram depicting an exemplary network 100 related to the current invention. Exemplary networks include switched networks, Internet protocol (IP) networks, Asynchronous Transfer Mode (ATM) networks, frame-relay networks, and the like.

A switched network is broadly defined as a network that creates continuous pathways between callers and called parties by disconnecting and reconnecting lines in various configurations (i.e. by switching). ATM, frame-relay and IP networks, etc. are packet based networks. An IP network is broadly defined as a network that uses Internet Protocol such as IPv4 or IPv6 and the like to exchange data packets.

In one embodiment, the network 100 may comprise a plurality of endpoint devices 102-104 configured for communication with the core packet network 110 (e.g., an IP based core backbone network supported by a service provider) or the switched network 121. The endpoint devices 102-104 may communicate with the switched network 121 and/or the IP/MPLS core network 110 via an access network 101. Similarly, a plurality of endpoint devices 105-107 are configured for communication with the core packet network 110 and/or the switched network 121 via an access network 108. The switched network 121 and the IP/MPLS core network 110 are connected to enable calls to originate in either network and complete in either network seamlessly. For example, a Gigabit switched router in the IP network may be connected to an edge switch in the switched network.

The network elements 109 and 111 may serve as gateway servers or edge routers for the IP/MPLS core network 110. Switches 122-124 may serve as switches or edge switches for the switched network 121.

The endpoint devices 102-107 may comprise customer endpoint devices such as personal computers, laptop computers, Personal Digital Assistants (PDAs), servers, routers, and the like. The access networks 101 and 108 serve as a means to establish a connection between the endpoint devices 102-107 and one or more of the NEs 109 and 111, and the switches 122-124. The access networks 101 and 108 may each comprise a Digital Subscriber Line (DSL) network, a broadband cable access network, a Local Area Network (LAN), a Wireless Access Network (WAN), a $3^{rd}$ party network, and the like.

The access networks 101 and 108 may be either directly connected to NEs 109 and 111 of the IP/MPLS core network 110 or through an Asynchronous Transfer Mode (ATM) and/or Frame Relay (FR) switch network 130. If the connection to the IP/MPLS core network 110 is through the ATM/FR network 130, the packets from customer endpoint devices 102-104 (traveling towards the IP/MPLS core network 110) traverse the access network 101 and the ATM/FR switch network 130 and reach the border element 109.

The ATM/FR network 130 contains Layer 2 switches functioning as Provider Edge Routers (PER) and/or Provider Routers (PR). The PERs may also contain an additional Route Processing Module (RPM) that converts Layer 2 frames to Layer 3 Internet Protocol (IP) frames. An RPM enables the transfer of packets from a Layer 2 Permanent Virtual Connection (PVC) circuit to an IP network which is connectionless.

Some NEs (e.g., NEs 109 and 111) reside at the edge of the IP/MPLS core infrastructure and interface with customer endpoints over various types of access networks. An NE that resides at the edge of a core infrastructure is typically implemented as an edge router, a media gateway, a border element, a firewall, a switch, and the like. An NE may also reside within the IP network (e.g., NEs 118-120) and may be used as a mail server, honeypot, a router, or like device. The IP/MPLS core network 110 also comprises an application server 112 that contains a database 115. The application server 112 may comprise any server or computer that is well known in the art, and the database 115 may be any type of electronic collection of data that is also well known in the art. Those skilled in the art will realize that although only six endpoint devices, two access networks, five network elements, one application server, and so on are depicted in FIG. 1, the communication system 100 may be expanded by including additional endpoint devices, access networks, network elements, application servers, 3$^{rd}$ party networks, etc. without limiting the scope of the present invention.

The above IP network is described to provide an illustrative environment in which packets for voice and data services are transmitted on switched and/or IP networks. An enterprise customer may subscribe to a toll free call service (e.g., an 8YY voice service, e.g., Inward Wide Area Telecommunications Service (INWATS)). When a service failure or degradation occurs, it may be detected by the network service provider or reported by a customer to the network service provider. For example, a caller may detect a failure on an 8YY service and report the failure to the network service provider. For example, the caller may interact with an Interactive Voice Response (IVR) system and report an outage/degradation for a telephone number.

In one embodiment, the present invention discloses a method and apparatus for providing automatic processing of 8YY voice alarms on a network. In order to clearly describe the current invention, the following networking terminologies and concepts are first provided:

A switched network;
A class-4 central office;
A class-5 central office;
Class-4 Electronic Switching System (4ESS);
Class-5 Electronic Switching System (5ESS);
Wide Area Telephone Service (WATS);
SMS/800 database; and
Responsible organization (RespOrg).

A switched network refers to a network that interconnects class 4 and class 5 central offices as described below. The switching is accomplished by disconnecting and reconnecting lines in different configurations to enable a continuous pathway to be set up between a sender and a recipient.

A class-4 central office refers to a switching center for toll calls. A class 4 office, switches toll traffic originating at class 5 offices to other class 4 offices, or to offices of a higher class. A class 4 office also relays toll traffic from a class 4 toll office, to a class 5 office serving a destination address.

A class-5 central office refers to the lowest level in a hierarchy of central offices. A class 5 office serves as a network entry point for customer access lines. Class 5 central offices are also switching centers for local calls.

Class-4 Electronic Switching System (4ESS) refers to a switch used mainly in class 4 offices.

Class-5 Electronic Switching System (5ESS) refers to a switch used in class 5 offices, and sometimes in offices too small for class 4 switches.

Wide Area Telephone Service (WATS) refers to a telecommunication service that allows subscribers to make outgoing (OUTWATS) or incoming (INWATS) voice or data calls and be billed on a bulk rate basis as opposed to being billed for each incoming or outgoing long distance call. INWATS is a toll-free dialing service and OUTWATS is a bulk savings on long-distance dialing costs for subscribers. These two services are provided by special access lines connected at a WATS service provider. A single access line for a WATS service handles either INWATS or OUTWATS, but not both.

For example, large companies use OUTWATS to receive bulk-rate discounts for calls initiated by said large customer. INWATS is used to enable calls directed towards the customer to be toll free for the caller. For example, if a user dials an 8YY number (e.g., an 1-800-XXX-XXXX number) to speak to an enterprise, the caller is not charged for the call. Instead, the receiver (i.e., the enterprise with the 8YY service) pays for the call based on an agreement with the service provider.

SMS/800 database refers to a global database that contains the status of all toll-free numbers. 8YY service providers are certified by an SMS/800 database administrator which manages the toll-free numbers.

Responsible organization (RespOrg) refers to a 8YY service provider certified by the SMS/800 database administrator.

Figure 2:
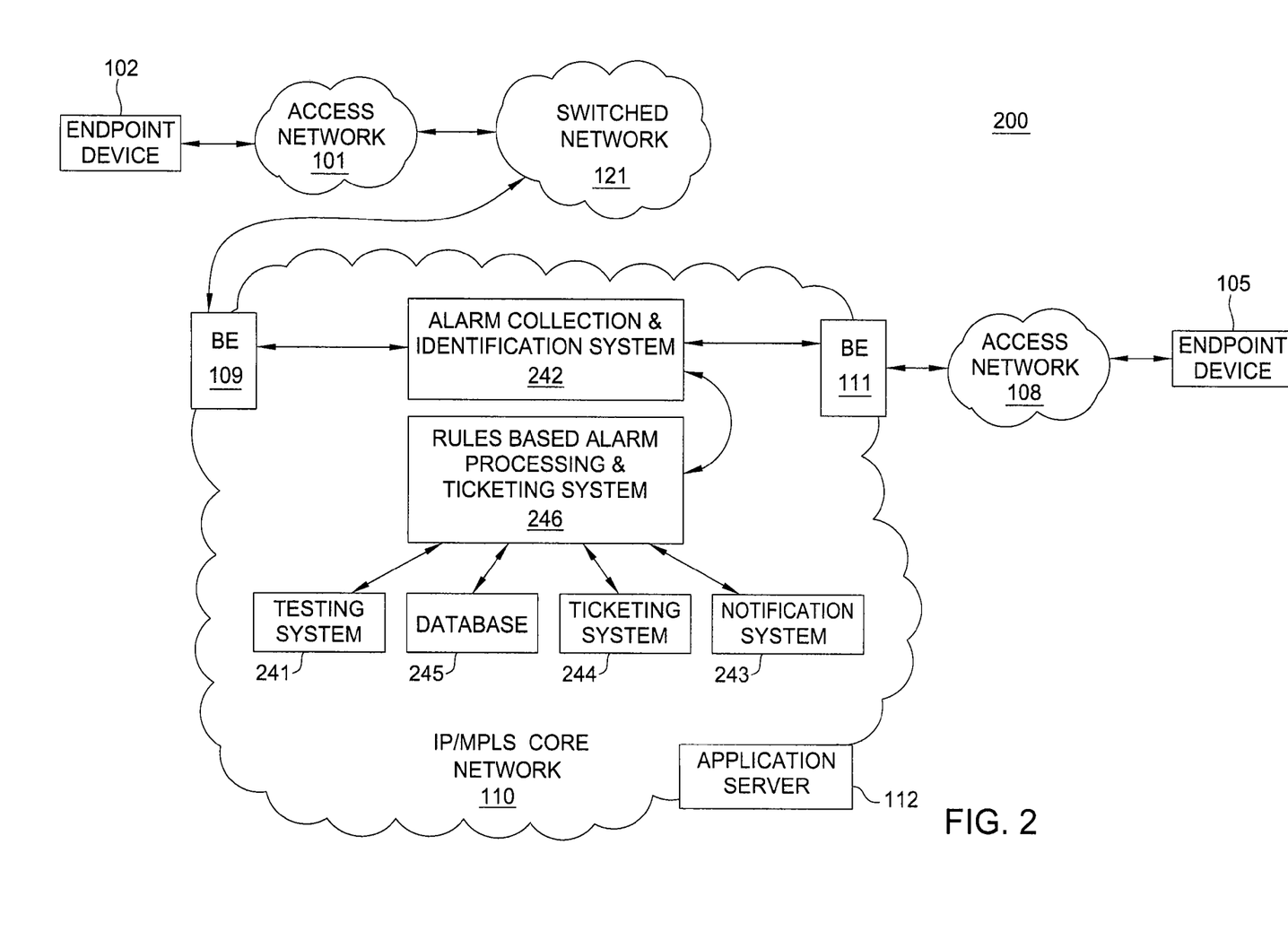
FIG. 2 illustrates an exemplary network with automated processing of an 8YY voice alarm.

FIG. 2 illustrates an exemplary network 200 with automated processing of an 8YY voice alarm. For example, an enterprise customer with endpoint device 102 is communicating with a switched network 121 via an access network 101. Another customer with an endpoint device 105 is communicating with an IP/MPLS core network 110 via an access network 108.

In one embodiment, the IP/MPLS core network 110 comprises application server 112, border elements 109 and 111, a testing system 241, an alarm collection and identification system 242, a notification system 243, a ticket generation system 244, a database of record 245, and a rule based alarm processing and ticketing system 246.

Border elements 109 and 111 function as PE routers for the IP/MPLS core network 110. The rule based alarm processing and ticketing system 246 is connected to the various systems 241-245 for automating processing of network alarms. The application server 112 enables customers to subscribe to services with automated processing of network alarms.

In one embodiment, the testing system 241 is used for sending test packets and receiving responses. For example, the testing system 241 may send "ping" signal to ports on switches, get snapshots of various counters in routers and switches, and so on.

In one embodiment, the ticket generation system 244 is accessible by customers and service provider personnel. For example, a customer or work center personnel may interact with an Interactive Voice Response (IVR) system and generate a ticket. The ticket may also be created by automatically detected alarms by alarm collection and identification system 242. The alarm collection and identification system 242 is connected to PE routers 109 and 111. Similarly, the notification system 243 may be used to provide one or more notifications to a customer, or one or more work centers.

For example, the enterprise customer with an endpoint device 102 may receive a call from a user with an endpoint device 105. That is, the called party may have subscribed to an 8YY service from the switched network, while the caller subscribes to services from the IP/MPLS network, e.g., a Voice over Internet Protocol (VoIP) network.

In one embodiment, the current invention provides automatic processing of 8YY service alarms. In one example, a caller of an 1-800 number reports trouble to a service provider via an IVR system. For example, a customer may report trouble for a 1-800-XXX-XXXX telephone number he/she is attempting to dial. The report/alarm may be forwarded to the service provider's rule based alarm processing and ticketing system 246. The rule based alarm processing and ticketing system 246 may then process the ticket/alarm.

FIG. 3 (collectively illustrated as FIG. 3A-FIG. 3F) provides a flowchart of a method 300 for providing processing of 8YY service alarms. For example, method 300 or portion of method 300 can be implemented by the rules based alarm processing and ticketing system 246. Method 300 starts in step 301 and proceeds to step 302.

In step 302, method 300 receives a trouble ticket for an 8YY service and retrieves the calling to and calling from numbers from the trouble ticket. For example, the method retrieves the calling party's phone number (calling from number) and the called party's phone number (calling to number).

In step 303, method 300 queries the SMS/800 global database for 8YY services using the calling to number. For example, the method may query for the responsible organization (RespOrg) for the calling to number.

In step 304, method 300 determines whether or not the service provider is responsible for the 8YY service as listed in said SMS/800 global database. If the service provider is not responsible for the 8YY service, the method proceeds to step 305. Otherwise, method 300 proceeds to step 306.

In step 305, method 300 determines whether or not the service provider is responsible for the Inter-Lata and/or Intra-Lata transport. INTRALATA is known as "local toll" or "local long distance." These are calls that originate and terminate in the same Local Access Transport Area (LATA), but still require a 1+ in order to complete them. INTERLATA call refers to a call that is placed within one LATA (Local Access Transport Area) and received in a different LATA. In one embodiment, the method may obtain the Carrier Identification Code (CIC) from a database and determine whether or not the CIC is that of the service provider. If the service provider is responsible for the Inter-Lata and/or Intra-Lata transport, the method then proceeds to step 310. Otherwise, the method proceeds to step 308.

In step 306, method 300 determines whether the status of the customer's network is active. If the customer's network is not active, the method proceeds to step 307. Otherwise, the method proceeds to step 305.

In step 307, method 300-notifies a work center that the customer's network is not active. The method then returns to step 302.

In step 308, method 300 determines whether or not the service provider is responsible for the 8YY service. If the service provider is responsible for the 8YY service, method 300 proceeds to step 309. Otherwise, the method proceeds to step 316.

In step 309, method 300 notifies a work center that the CIC and responsible organization are mismatched. The method then returns to step 302.

In step 310, method 300 determines whether or not the service provider is responsible for the 8YY service. If the service provider is responsible for the 8YY service, method 300 proceeds to step 312. Otherwise, the method proceeds to step 311.

In step 311, method 300 notifies a work center that the CIC and responsible organization are mismatched. The method then returns to step 302. That means, the service provider is responsible for the Inter-Lata and/or Intra-Lata transport, but is not responsible for the 8YY service. The method then notifies a work center that the CIC and responsible organization are mismatched.

In step 312, method 300 whether or not the call originated from a valid location. For example, the service provider is responsible for the Inter-Lata and/or Intra-Lata transport as well as the 8YY service, but the call may have originated from a location that is not valid for the 8YY service. For example, the 8YY number may be valid for domestic calls only and the call may have been originated from another country. If the call originated from outside a valid area, the method proceeds to step 313. Otherwise, the method proceeds to step 314.

In step 313, method 300 notifies a work center that the call originated from outside a valid location.

In step 314, method 300 queries the service provider's database for provisioning the 8YY service. The method then proceeds to step 315.

In step 315, method 300 determines whether or not the responsible organization in the service provider's provisioning database matches the responsible organization in the SMS/800 database. For example, the service provider may indicate itself as the responsible organization while the global SMS/800 database identifies another service provider as the responsible organization. If the responsible organizations in the SMS/800 database and the service provider's database match, the method proceeds to step 317. Otherwise, the method proceeds to step 316.

In step 316, method 300 notifies the customer that the service provider is not the responsible organization for the 8YY service and automatically closes the ticket. The method then returns to step 302.

In step 317, method 300 determine whether or not controls are placed by the service provider, e.g., for billing related issues. If a control is placed, the method proceeds to step 318. Otherwise, the method proceeds to step 319.

In step 318, method 300 notifies the customer that the called 8YY number is on a control list. The method then returns to step 302.

In step 319, method 300 determines whether or not the 8YY service is placed on unavailable status. For example, the service may be placed on a recorded message service. If the 8YY service is placed on unavailable status, the method proceeds to step 320. Otherwise, the method proceeds to step 321.

In step 320, method 300 notifies the work center that the service is placed on unavailable. The method then returns to step 302.

In step 321, method 300 determines whether or not the first Type of Termination (TOT) code is on a notification list. Type of Termination refers to a code that indicates whether a termination is a regular POTS number of an internal routing number. If the first TOT code is on a notification list, the method proceeds to step 322. Otherwise, the method proceeds to step 323.

In step 322, method 300 notifies the work center that the first TOT code is on a notification list. The method then proceeds to step 302.

In step 323, method 300 retrieves the Numbering Plan Area (NPA) from the service provider's 8YY database. The method then proceeds to step 324.

In step 324, method 300 determines whether or not the calling from number is on a blocked list of NPAs. For example, a specific list of area codes may be blocked from using the 8YY number. If the calling from number is on the blocked list of NPAs, the method proceeds to step 325. Otherwise, the method proceeds to step 326.

In step 325, method 300 notifies a work center that the 8YY service has a geographical restriction based on NPA. The method then returns to step 302.

In step 326, method 300 retrieves the Service Assurance (SA) plan, Vertical Service Indicator (VSI), and Numbering Plan Type (NPT) defined below from the service provider's 8YY database. The method then proceeds to step 327.

The SA refers to a service protection plan, e.g., a backup service. NPT refers to an indicator for an internal routing number or a regular phone number. For example, an NPT=A may indicate a routing number while NPT=N indicates a real 10-digit telephone number. VSI refers to an indicator of a service type. Table-1 provides an exemplary list of VSI values.

TABLE 1

An exemplary list of VSI values

| VSI Value | Service type |
| --- | --- |
| X | A classic service with POTS termination |
| B | A classic service with a single number targeted for small businesses |
| E | An enhanced service with network based features that allow customers to dynamically route and manage their 8YY calls virtually |
| K | An 8YY service that may have additional features |
| M | A service with direct egress from customer to the service provider's point of presence (POP) intended for high volume voice and data transport. Customer has circuit ID. |
| N | A service with a Network Remote Access (NRA) to allow toll-free access to a customer's Software Defined Network (SDN) |
| R | A toll-free ready-line inbound service terminating on an existing POTS line and targeted for small business customers |

In step 327, method 300 determines whether or not the 8YY service has a Service Assurance (SA) plan. If there is no SA for the service, the method proceeds to step 328. Otherwise, the method proceeds to step 329.

In step 328, method 300 notifies the work center that the 8YY service does not have an SA plan. The method then returns to step 302.

In step 329, method 300 determines whether or not the VSI value is for an 8YY service that may have additional features and the NPT indicates a regular phone number. For example, the method determines whether VSI=K and NPT=N. If VSI=K and NPT=N, the method proceeds to step 330. Otherwise, the method proceeds to step 331 to begin diagnosis based on calling from number.

In step 330, method 300 notifies a work center that the service may have advanced features. The method then returns to step 302.

In step 331, method 300 determines whether or not the calling from number is an IP telephone number. For example, the caller may be a customer of VoIP service or a customer of a switched service, e.g., based on 4ESS and 5ESS switches. If the calling from number is an IP telephone number, the method proceeds to step 332. Otherwise, the method proceeds to step 344.

In step 332, method 300 retrieves the IP address, router information, etc. from a database. For example, the calling party may subscribe to a Voice over Internet Protocol (VoIP) service. The method then retrieves the IP address, router information, etc. The method then proceeds to step 333.

In step 333, method 300 retrieves the status of one or more IP ports and proceeds to step 385.

In step 385, method 300 determines whether or not the links and protocols are active on the one or more IP ports. For example, the method may run show interface command to ports on routers to obtain port and protocol status. If the links and protocols are not active, the method proceeds to step 336. Otherwise, the method proceeds to step 334.

In step 334, method 300 retrieve the status of the customer router, e.g., by sending a ping command to the customer router from the provider edge router. The method then proceeds to step 335.

In step 335, method 300 determines whether or not a successful response is received from the customer router. If a successful response is received from the customer router, the method proceeds to step 340. Otherwise, the method proceeds to step 336.

In step 336, method 300 verifies network configuration. For example, the method may run show interface command to determine network configurations. The method then proceeds to step 337.

In step 337, method 300 determines whether or not the customer's Virtual Route Forwarding (VRF) table and Provider Edge Router (PER) IP address match those in database. If the VRF table and PER IP address match those in database, the method proceeds to step 338. Otherwise, method 300 proceeds to step 339.

In step 338, method 300 notifies the work center to create a trouble ticket indicating a potential IP network problem. The method then proceeds to step 302.

In step 339, method 300 notifies the work center of a possible configuration problem. The method then proceeds to step 302.

In step 340, method 300 retrieves the status of the edge router that connects the class 5 switch to the IP network. For example, the method may ping the edge router. The method then proceeds to step 341.

In step 341, method 300 determines whether or not the status of the edge router identified any trouble, e.g., is the edge router active. If no trouble is identified (e.g., edge router is active), the method proceeds to step 343. Otherwise, the method proceeds to step 342.

In step 342, method 300 notifies the work center of a possible problem in the service provider's network. A work center personnel may then initiate one or more remedy steps. The method then proceeds to step 302.

In step 343, method 300 notifies a customer that no trouble is detected and/or to verify the status of customer premise equipment. The method then closes the current ticket and proceeds to step 302.

In step 344 (shown in FIG. 3C), method 300 identifies the home switch for the calling from number, e.g., the class-4 or class-5 switch closest to the caller.

Figure 3A:
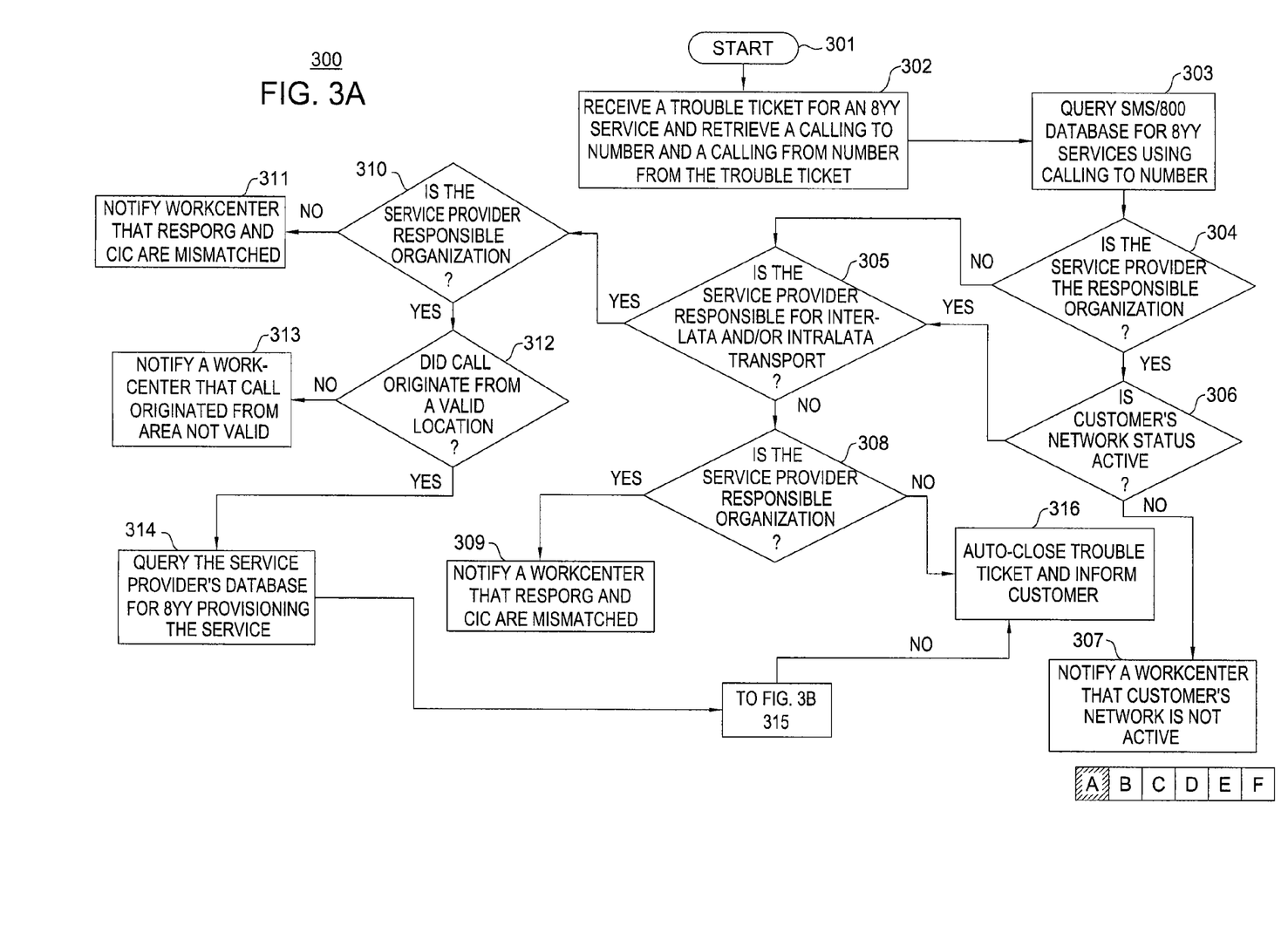
FIG. 3 (collectively illustrated as FIG. 3A-FIG. 3F) illustrates a flowchart of a method for providing automated processing of an 8YY voice alarm.
Figure 3B:
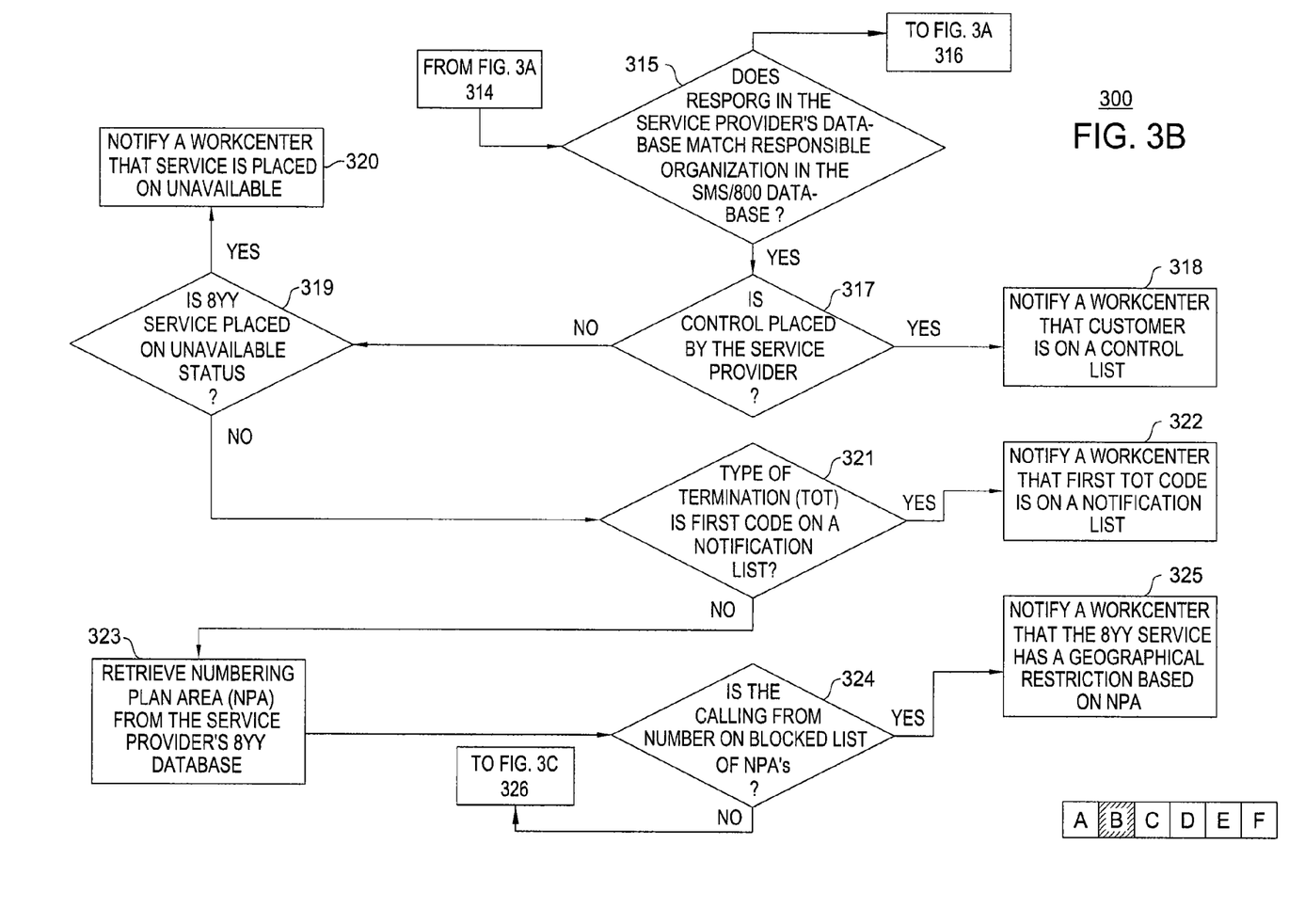
Figure 3C:
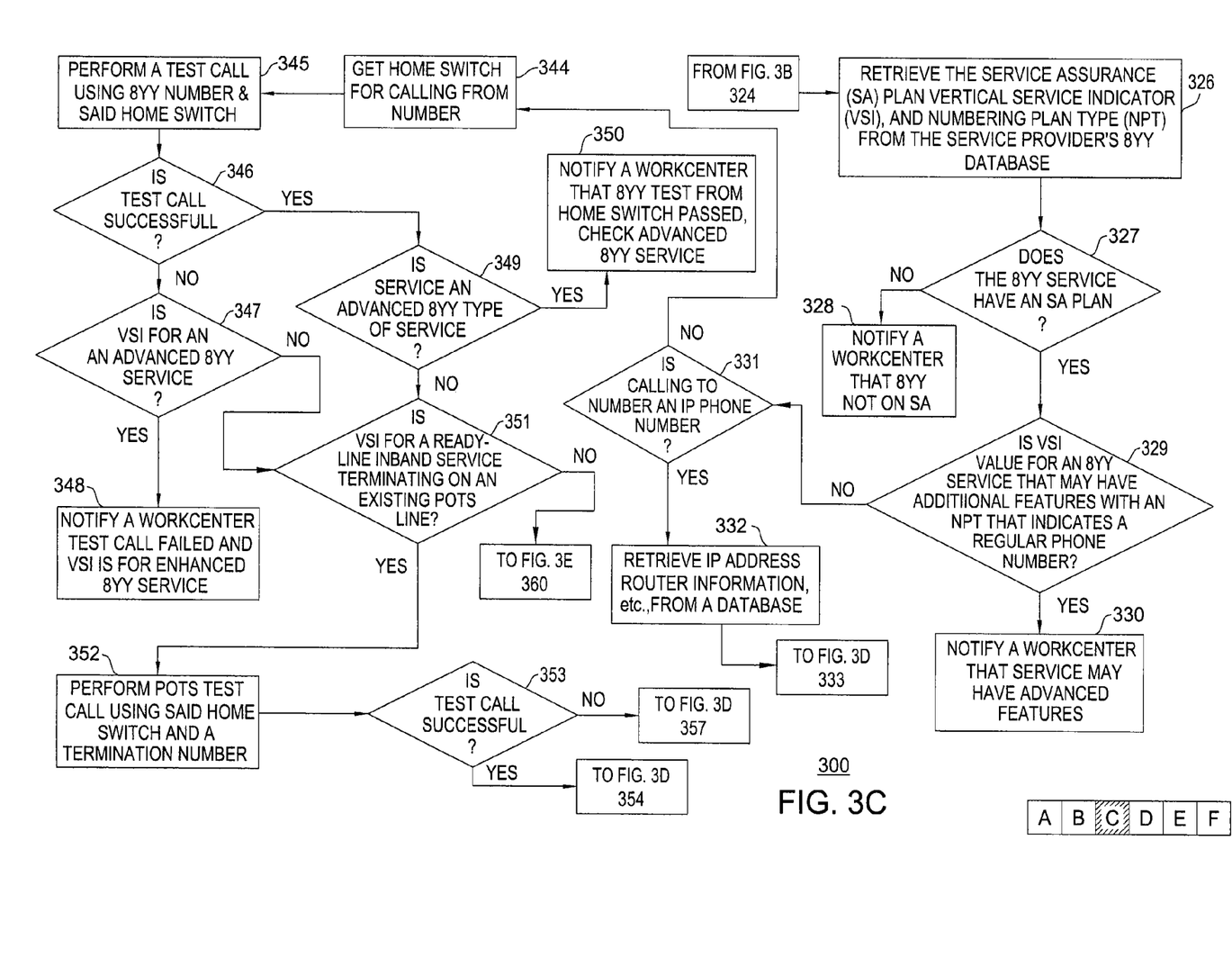
Figure 3D:
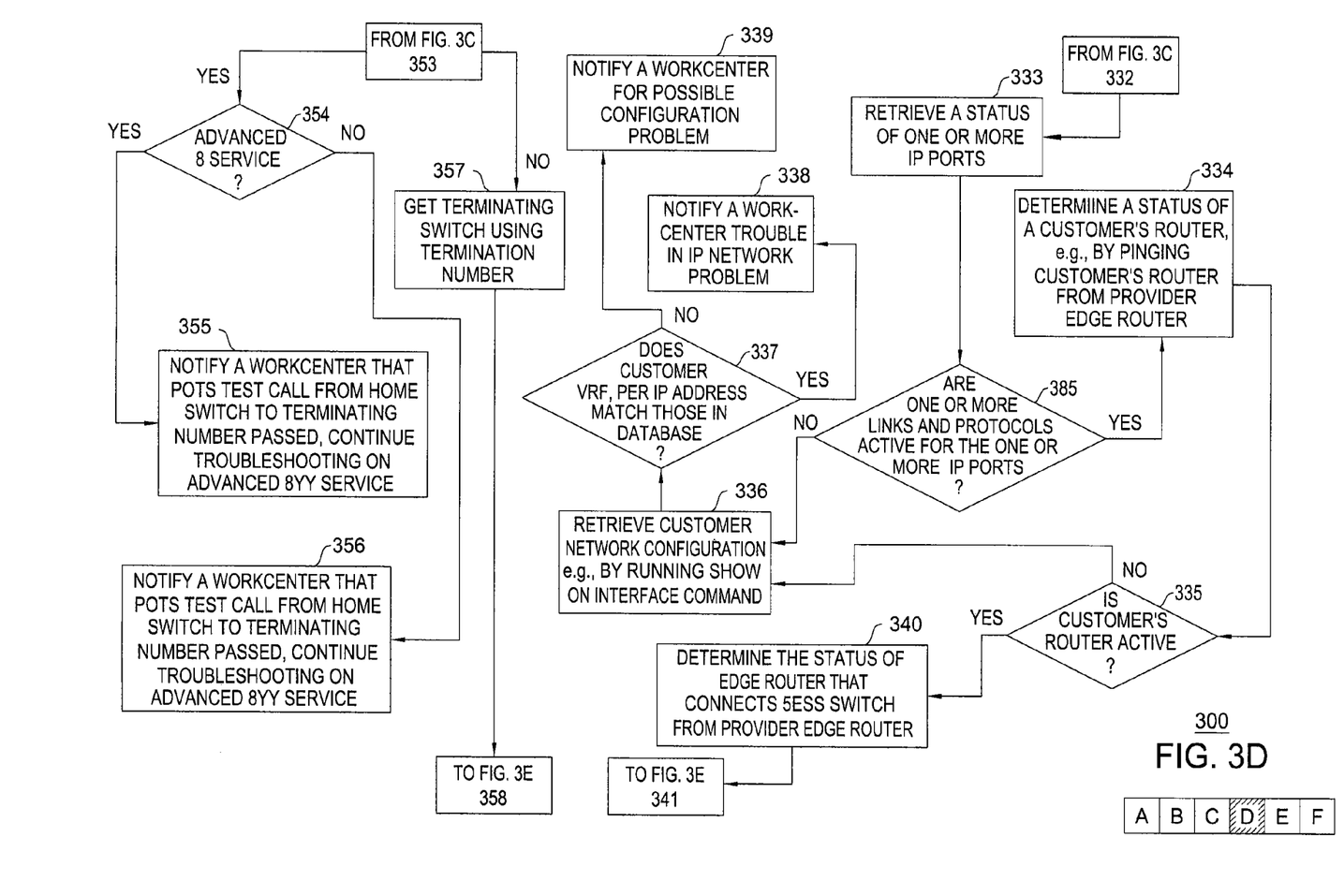
Figure 3E:
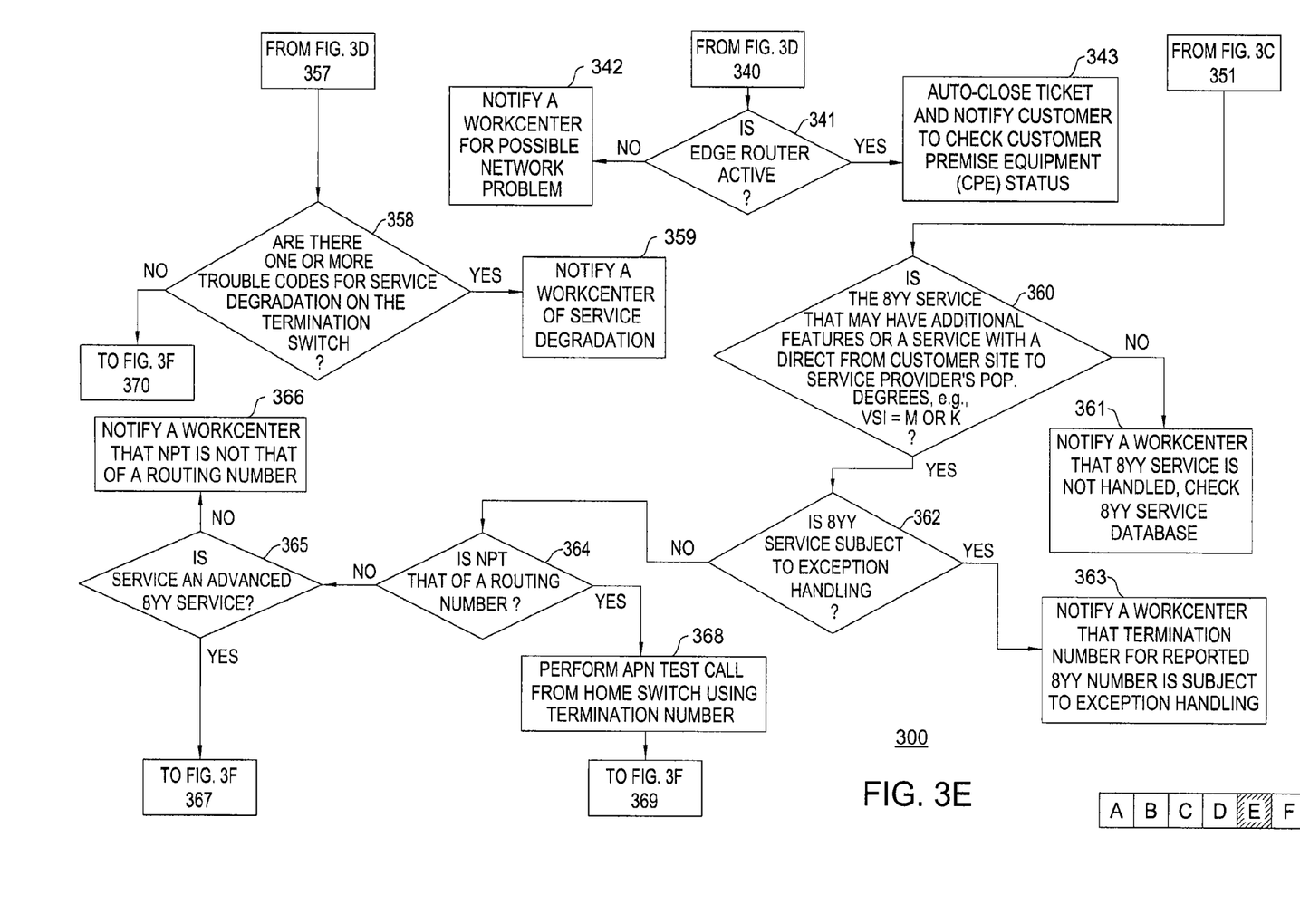
Figure 3F:
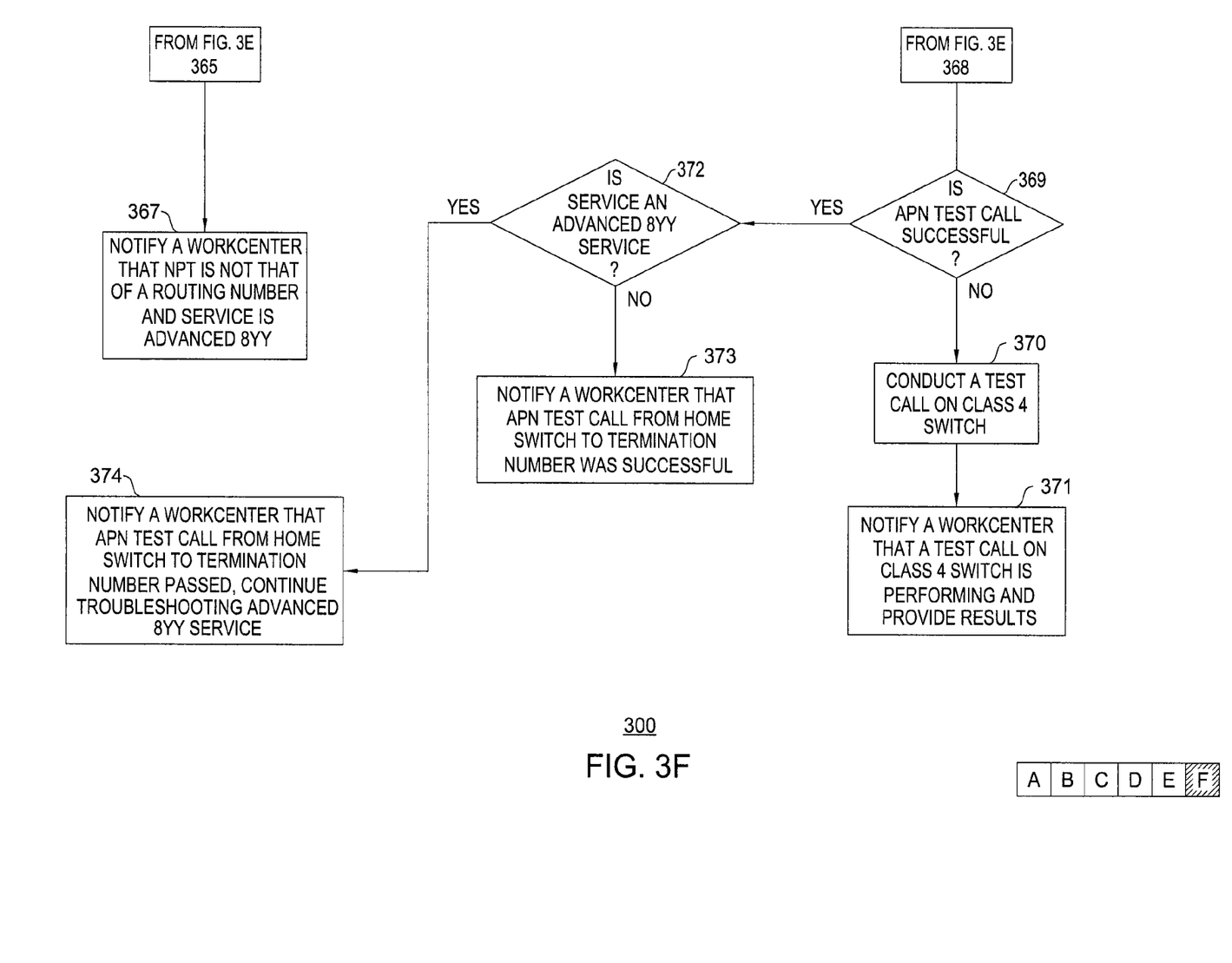

In step 345, method 300 performs a test call using the 8YY number and the home switch. The method then proceeds to step 346.

In step 346, method 300 determines whether or not the test call was successful. If the test call was successful, the method then proceeds to step 349. Otherwise, the method proceeds to step 347.

In step 347, method 300 determines whether or not the calling from number is for an enhanced service. For example, for VSI=E, namely for a service with network based features that allow customers to dynamically route and manage their 8YY calls. If the VSI=E, the method proceeds to step 348. Otherwise, the method proceeds to step 351.

In step 348, method 300 notifies the work center that the test call from originating switch has failed, and notifies troubleshooting to continue from call origination to 8YY service. The method then proceeds to step 302.

In step 349, method 300 determines whether or not the 8YY service is an advanced 8YY service. If the 8YY service is an advanced 8YY service, the method proceeds to step 350. Otherwise, the method proceeds to step 351.

In step 350, method 300 notifies a work center that the test call was successful and the service is an advanced 8YY service. The method then returns to step 302.

In step 351, method 300 determines whether or not the 8YY service for a ready-line inbound service terminating on an existing POTS line. For example, whether or not VSI=R. If VSI=R, method 300 proceeds to step 352. Otherwise, the method proceeds to step 360.

In step 352, method 300 performs a POTS test call using original switch and termination number. The method then proceeds to step 353.

In step 353, method 300 determines whether or not the POTS test call was successful. If the test was successful, the method proceeds to step 354. Otherwise, the method proceeds to step 357.

In step 354, method 300 whether or not the 8YY service is an advanced 8YY service. If the service is an advanced 8YY service, the method proceeds to step 355. Otherwise, the method proceeds to step 356.

In step 355, method 300 notifies the work center that the test call from originating switch to terminating switch was successful and to continue troubleshooting advanced 8YY service. The method then returns to step 302.

In step 356, method 300 notifies the work center that the test call from originating switch to terminating switch was successful and to continue troubleshooting 8YY service. The method then returns to step 302.

In step 357, method 300 identifies the termination switch using the termination number. The method then proceeds to step 358.

In step 358, method 300 determines if there are trouble codes for service degradation on the termination switch. For example, the method retrieves indications for one or more of: a cut-off condition, a noise condition, a static condition, a crosstalk condition, a low volume condition, or an echo condition, that may cause service degradation. If a trouble code for a service degradation exists, the method proceeds to step 359. Otherwise, the method proceeds to step 370.

In step 359, method 300 notifies a work center of a service degradation on the termination switch. The method then proceeds to step 302.

In step 360, method 300 determines whether or not the 8YY service is a service that may have additional features or a service with a direct egress from customer site to the service provider's POP. For example, whether or not the VSI=M or K. If the VSI=M or K, the method proceeds to step 362. Otherwise, the method proceeds to step 361.

In step 361, method 300 notifies the work center that the service is not handled and to verify the 8YY service database. The method then proceeds to step 302.

In step 362, method 300 determines whether or not the 8YY service is subject to exception handling. For example, the termination number may indicate a Split Access Flexible Egress Routing (SAFER). If the service is subject to exception handling, the method proceeds to step 363. Otherwise, the method proceeds to step 364.

In step 363, method 300 notifies the work center that the termination number is subject to exception handling and to continue troubleshooting manually.

In step 364, method 300 determines whether or not the Number Plan Type (NPT) for the service is that of a routing number. For example, whether or not NPT=A. If NPT=A, method 300 proceeds to step 368. Otherwise, method 300 proceeds to step 365.

In step 365, method 300 determines whether or not the 8YY service is an advanced 8YY service. If the service is an advanced 8YY service, the method proceeds to step 367. Otherwise, the method proceeds to step 366.

In step 366, method 300 notifies a work center that the NPT is not that of a routing number (NPT is not A). For example, the VSI for an 8YY service with direct egress (VSI=M) is used without an NPT of a routing number. The method then proceeds to step 302.

In step 367, method 300 notifies a work center that the NPT is not that of a routing number and the service is advanced 8YY. For example, VSI=M, NPT is not that of a routing number, and the service is advanced 8YY. The method then proceeds to step 302.

In step 368, method 300 performs an APN test call from home switch using the termination number. The method then proceeds to step 369.

In step 369, method 300 determines whether or not the APN test call was successful. If the test call was successful, method 300 proceeds to step 372. Otherwise, the method proceeds to step 370.

In step 370, method 300 conducts a test call on class 4 switch, e.g., a test call on the 4ESS switch. The method then proceeds to step 371.

In step 371, method 300 notifies a work center that a test call on class 4 switch was performed and also provides the result. The method then proceeds to step 302.

In step 372, method 300 determines whether or not the 8YY service was an advanced 8YY service. If the service is an advanced 8YY service, the method proceeds to step 374. Otherwise, the method proceeds to step 373.

In step 373, method 300 notifies the work center that the APN test call from original switch to termination number was successful. The method then proceeds to step 302.

In step 374, method 300 notifies said work center that APN test call from original switch to termination number was successful and to continue troubleshooting advanced 8YY service. The method then proceeds to step 302.

It should be noted that although not specifically specified, one or more steps of method 300 may include a storing, displaying and/or outputting step as required for a particular application. In other words, any data, records, fields, and/or intermediate results discussed in the method 300 can be stored, displayed and/or outputted to another device as required for a particular application. Furthermore, steps or blocks in FIG. 3 that recite a determining operation, or involve a decision, do not necessarily require that both branches of the determining operation be practiced. In other words, one of the branches of the determining operation can be deemed as an optional step.

Figure 4:
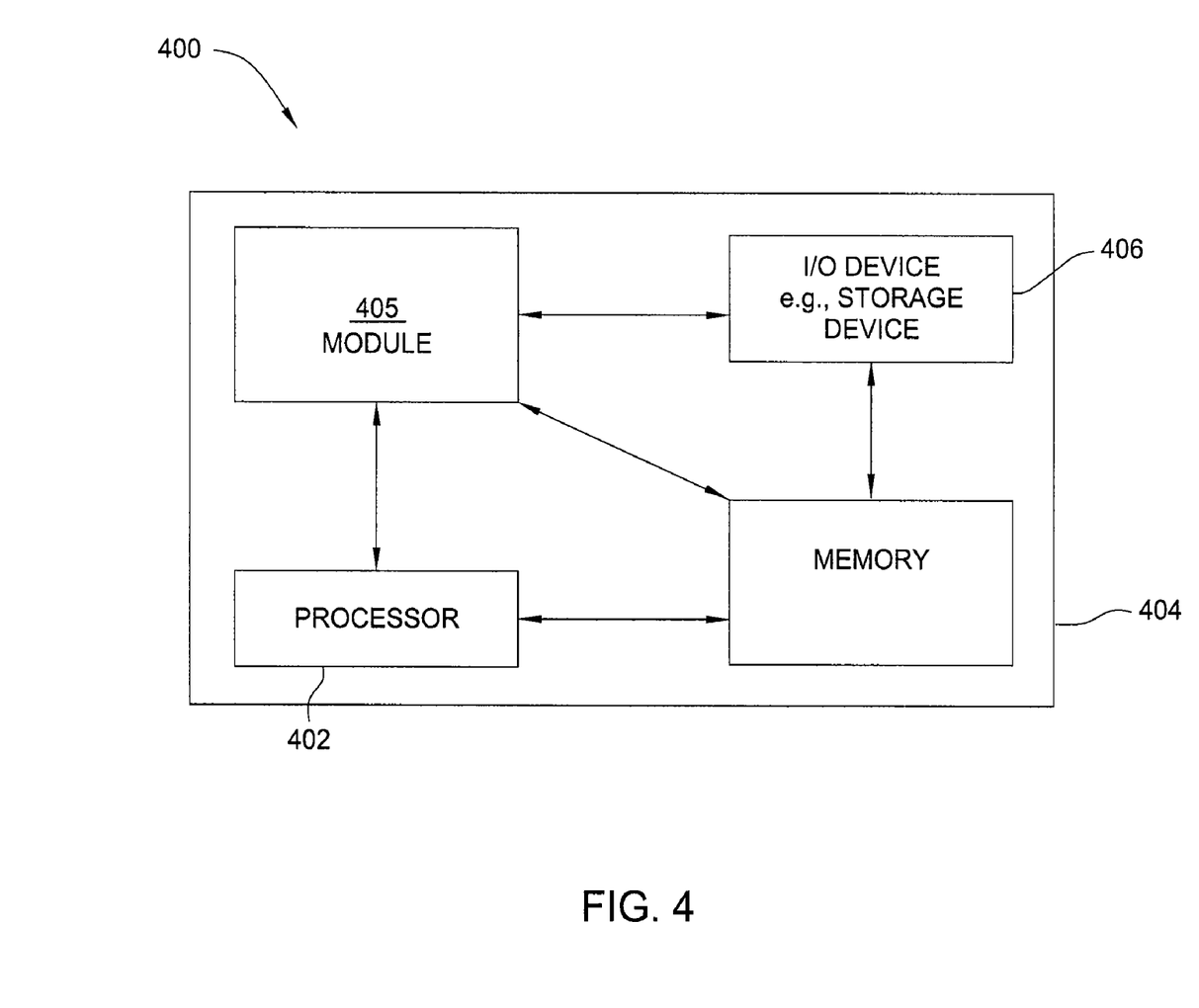
FIG. 4 illustrates a high-level block diagram of a general-purpose computer suitable for use in performing the functions described herein.

FIG. 4 depicts a high-level block diagram of a general-purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for providing automatic processing of an 8YY voice alarm, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 405 for providing automatic processing of an 8YY voice alarm can be loaded into memory 404 and executed by processor 402 to implement the functions as discussed above. As such, the present method 405 for providing automatic processing of an 8YY voice alarm (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for processing a toll free call service alarm associated with a toll free call service, comprising:
   receiving a trouble ticket by a service provider for the toll free call service alarm associated with a call;
   retrieving a calling to number and a calling from number from the trouble ticket;
   determining if the service provider is a responsible organization for providing the toll free call service for the calling to number;
   determining if a customer network for the toll free call service is active if the service provider is the responsible organization for the toll free call service; and
   notifying a work center if the customer network is not active.

2. The method of claim 1, further comprising:
   determining if the service provider is responsible for an intra-lata transport or an inter-lata transport for the toll free call service; and
   notifying the work center of a mismatch if the service provider is either responsible for the intra-lata transport or the inter-lata transport for the toll free call service, or if the service provider is the responsible organization for the toll free call service.

3. The method of claim 2, further comprising:
   determining if the call originated from a valid location if the service provider is responsible for both the intra-lata transport or the inter-lata transport and the toll free call service;
   notifying a work center if the call originated from an invalid location;
   determining if the responsible organization in a service provider database matches that of an SMS/800 database if the call originated from the valid location; and
   notifying a customer that the service provider is not the responsible organization for the toll free call service if the responsible organization in the service provider database and SMS/800 database do not match.

4. The method of claim 3, further comprising:
   determining if either a control is placed by the service provider for the toll free call service, or if the toll free call service is placed on an unavailable status, or a first type of termination code is on a notification list, or the calling from number is on a blocked list of numbering plan areas; and
   notifying the work center if the control is placed by the service provider, or the toll free call service is placed on the unavailable status, or the type of termination code is on the notification list, or the calling from number is on the blocked list of numbering plan areas.

5. The method of claim 4, further comprising:
   retrieving a service assurance plan, a vertical service indicator, or a numbering plan type from a database for the toll free call service;
   notifying the work center if the toll free call service does not have the service assurance plan; and
   notifying the work center if the vertical service indicator is for a service that has an additional feature and the numbering plan type indicates a regular phone number.

6. The method of claim 5, further comprising:
   determining if the calling from number is an internet protocol telephone number.

7. The method of claim 6, further comprising:
   retrieving a status of an internet protocol port if the calling from number is the internet protocol telephone number;
   determining if a link or a protocol is active for the internet protocol port;
   determining a status of a customer router if the link or the protocol is active; and
   retrieving a customer network configuration if the link, the protocol or the customer router is inactive.

8. The method of claim 7, further comprising:
   determining a status of an edge router that connects a class 5 switch to an internet protocol network if the customer router is active; and
   notifying the work center responsible for the edge router if the toll free call service alarm is due to a trouble for the edge router.

9. The method of claim 7, further comprising:
   determining if a customer virtual route forwarding table or a provider edge router internet protocol address matches information stored in a database from the customer network configuration;
   notifying the work center if the virtual route forwarding table or the provider edge router internet protocol address does not match the information stored in the database; and
   notifying the work center of a trouble in an internet protocol network if the virtual route forwarding table or the provider edge router internet protocol address matches the information stored in the database.

10. The method of claim 6, further comprising:
    performing a test call using a toll free number and a home switch for the calling from number, if the calling from number is not an internet protocol number;
    determining if the toll free call service is an advanced 8YY service if the test call is successful;
    determining if the vertical service indicator is for an enhanced 8YY service if the test call is not successful; and
    notifying the work center if the test call is not successful and the vertical service indicator is for an enhanced 8YY service.

11. The method of claim 10, further comprising:
    determining if the vertical service indicator is for a ready-line inbound service terminating on an existing plain old telephone service line;
    performing a plain old telephone service test call using the home switch and a termination number if the vertical service indicator is for the ready-line inbound service terminating on an existing plain old telephone service line;
    notifying the work center if the plain old telephone service test call is successful;
    determining a termination switch for the termination number if the plain old telephone service test is not successful;
    determining if a trouble code for a service degradation exists on the termination switch; and
    notifying the work center if the service degradations exists.

12. The method of claim 10, further comprising:
determining if the vertical service indicator is either for a service that has an additional feature or a service with a direct egress from a customer site to a service provider point of presence;
determining if the toll free call service is subject to an exception handling if the vertical service indicator is either for a service that has an additional feature or a service with a direct egress from the customer site to the service provider point of presence; and
notifying the work center of the exception handling.

13. The method of claim 12, further comprising:
determining if the numbering plan type for the toll free call service is that of a routing number.

14. The method of claim 13, further comprising:
determining if the toll free call service is an advanced 8YY service if the numbering plan type is not that of the routing number;
notifying the work center if the toll free call service is an advanced 8YY service and the numbering plan type is not that of the routing number; and
notifying the work center if the toll free call service is not an advanced 8YY service and the numbering plan type is not that of the routing number.

15. The method of claim 13, further comprising:
performing a test call from the home switch using a termination number if the numbering plan type is that of the routing number;
performing a test call on a class 4 switch if the test call from the home switch using the termination number is not successful; and
determining if the toll free call service is an advanced 8YY service if the test call from the home switch using the termination number is successful.

16. The method of claim 15, further comprising:
notifying the work center if the toll free call service is not an advanced 8YY service and the test call from the home switch using the termination number is successful; and
notifying the work center to continue troubleshooting on advanced 8YY service if the toll free call service is the advanced 8YY service and the test call from the home switch using the termination number is successful.

17. A tangible computer-readable medium having stored thereon a plurality of instructions, the plurality of instructions including instructions which, when executed by a processor, cause the processor to perform operations for processing a toll free call service alarm associated with a toll free call service, the operations comprising:
receiving a trouble ticket by a service provider for the toll free call service alarm associated with a call;
retrieving a calling to number and a calling from number from the trouble ticket;
determining if the service provider is a responsible organization for providing the toll free call service for the calling to number;
determining if a customer network for the toll free call service is active if the service provider is the responsible organization for the toll free call service; and
notifying a work center if the customer network is not active.

18. The tangible computer-readable medium of claim 17, further comprising:
determining if the service provider is responsible for an intra-lata transport or an inter-lata transport for the toll free call service; and
notifying the work center of a mismatch if the service provider is either responsible for the intra-lata transport or the inter-lath transport for the toll free call service, or if the service provider is the responsible organization for the toll free call service.

19. The tangible computer-readable medium of claim 18, further comprising:
determining if a call originated from a valid location if the service provider is responsible for both the intra-lata transport or the inter-lata transport and the toll free call service;
notifying the work center if the call originated from an invalid location;
determining if the responsible organization in a service provider database matches that of an SMS/800 database if the call originated from the valid location; and
notifying a customer that the service provider is not the responsible organization for the toll free call service if the responsible organization in the service provider database and SMS/800 database do not match.

20. An apparatus for processing a toll free call service alarm associated with a toll free call service, comprising:
a processor; and
a computer readable medium in communication with the processor, the computer readable medium has stored thereon instructions that, when executed by the processor, cause the processor to perform operations, the operations comprising:
receiving a trouble ticket by a service provider for the toll free call service alarm associated with a call;
retrieving a calling to number and a calling from number from the trouble ticket;
determining if the service provider is a responsible organization for providing the toll free call service for the calling to number;
determining if a customer network for the toll free call service is active if the service provider is the responsible organization for the toll free call service; and
notifying a work center if the customer network is not active.

* * * * *